United States Patent [19]

Lovelace et al.

[11] 4,407,165

[45] Oct. 4, 1983

[54] APPARATUS FOR ACCURATELY PRELOADING AUGER ATTACHMENT MEANS FOR FRANGIBLE PROTECTIVE MATERIAL

[75] Inventors: Alan M. Lovelace, Washington, D.C.; Kenneth E. Wood, Long Beach, Calif.

[73] Assignee: The United States of America as represented by the Administrator of the National Aeronautics and Space Administration, Washington, D.C.

[21] Appl. No.: 248,746

[22] Filed: Mar. 30, 1981

[51] Int. Cl.³ .............................................. G01L 5/00
[52] U.S. Cl. .................................. 73/862.54; 29/446; 81/55; 81/57.38
[58] Field of Search ...................... 73/161, 761, 862.21, 73/862.42, 862.54; 254/29 A; 29/446, 526 R; 81/55, 57.38

[56] References Cited

U.S. PATENT DOCUMENTS

| | | | |
|---|---|---|---|
| 2,693,109 | 11/1954 | Gould et al. | 73/161 |
| 2,760,393 | 8/1956 | Stough | 73/761 X |
| 3,323,394 | 6/1967 | Bangerter et al. | 81/55 X |
| 3,394,623 | 7/1968 | Kinakin | 81/55 |
| 3,936,927 | 2/1976 | Schneider | 29/526 R |
| 4,304,156 | 12/1981 | Boudet et al. | 81/57.38 X |

Primary Examiner—Charles A. Ruehl
Attorney, Agent, or Firm—Russell E. Schlorff; John R. Manning; Marvin F. Matthews

[57] ABSTRACT

Apparatus for preloading a spring loaded threaded member. The apparatus is formed of three telescoping tubes. The innermost tube has means to prevent rotation of the threaded member. The middle tube is threadedly engaged with the threaded member and by axial movement applies a preload thereto. The outer tube engages a nut which may be rotated to retain the threaded member in axial position to maintain the preload.

7 Claims, 7 Drawing Figures

APPARATUS FOR ACCURATELY PRELOADING AUGER ATTACHMENT MEANS FOR FRANGIBLE PROTECTIVE MATERIAL

The Invention described herein was made in the performance of work under a NASA contract and is subject to the provisions of Section 305 of the National Aeronautics and Space Act of 1958, Public Law 85-568 (72 Stat. 435; U.S.C. 2457).

DESCRIPTION

Technical Field

This invention relates to means for applying a predetermined preload to the attaching means, for instance, of the auger type, for frangible materials, as thermal protection tiles applied to space vehicles.

Background Art

In Schneider U.S. Pat. No. 3,936,927, an auger embedded in the thermal protective tile is resiliently attached to surface structure of a spacecraft by means of a screw or bolt which extends from a blind fastener under the surface skin, axially into the hollow auger stem. Stacked Belleville washers interposed between the kerfed head of the screw and the base of the stem are compressed manually by means of a screwdriver inserted through a tool hole drilled into the opposite side of the tile. Obviously, this method of preloading is not very accurate, being subject to variables such as spring rate change, measurement accuracy, and leverage factors.

The Present Invention

The main object of the present invention is to provide means for accurately adjusting and securing the preload upon the spring means which resiliently secures the tile embedded auger to the protected structure, as in the Schneider patent. A novel, multi-part tool and mounting jig are provided for achieving this result through limited access available.

DETAILED DESCRIPTION OF THE DRAWINGS

Figure 1:
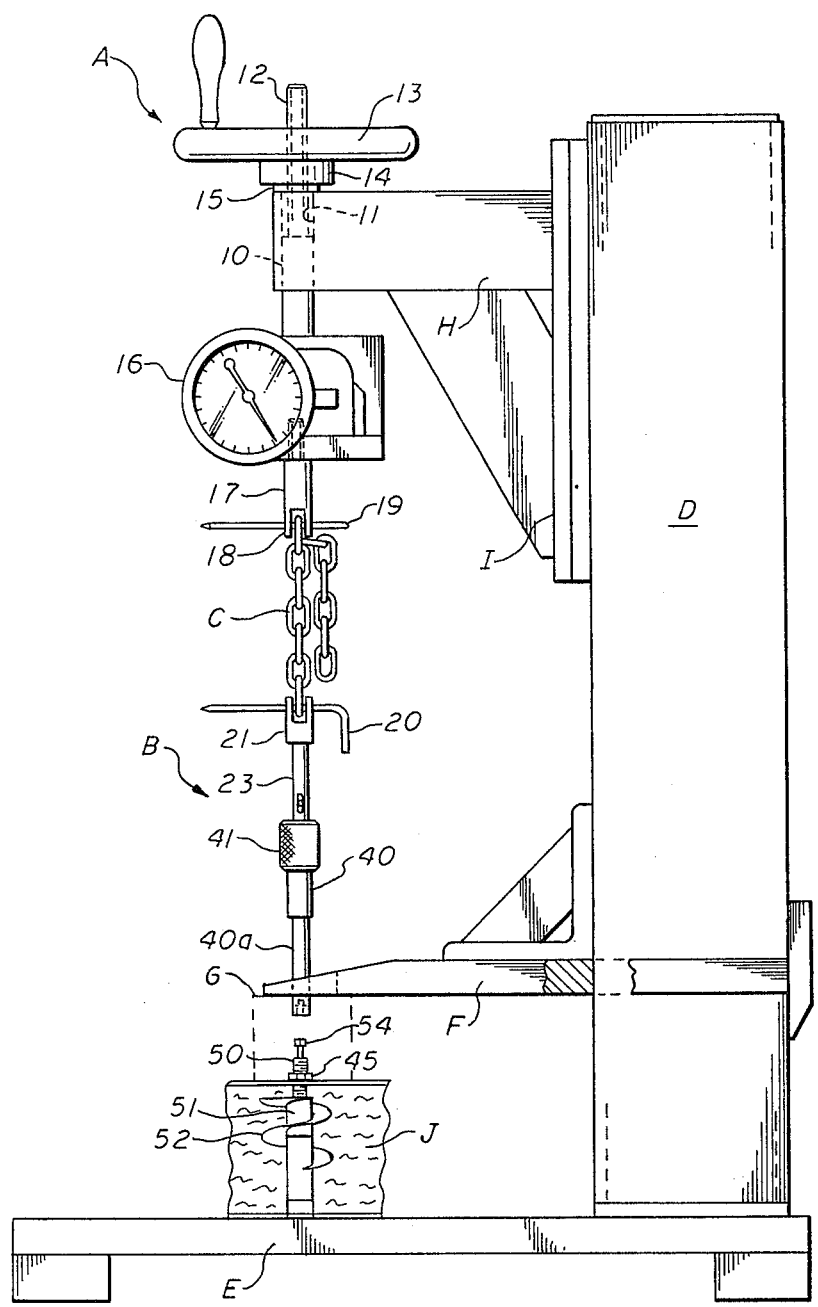
FIG. 1 is an elevation showing the novel tool and jig or stand, constituting a preferred form of the invention, assembled for accurately applying a predetermined preload to the auger spring means.

FIG. 1 shows a stand or jig A supporting the screw manipulating tool B by means of the chain C. The stand A consists of the upright, box-section pillar or stanchion D projecting above a base plate E for placement, beneath a work piece restraint arm F, of a frangible protective tile J and reinforcement structure G to which it is to be secured. A heavy arm H projecting sidewardly from pillar D has a bracket plate I adjustably secured to the pillar.

A shaft 10 depending through a vertical hole 11 near the end of arm H has a reduced upper portion 12 threadedly receiving a hand wheel 13 with its threaded hub 14 resting against arm H through a bearing washer 15. Shaft 12 protrudes beneath heavy arm H and there carries the mechanical force gauge 16. The force registering member of the gauge is activated by a pintle 17 having a bottom end clevis 18 in which a link of chain C is secured by means of a pin 19.

Figure 2:
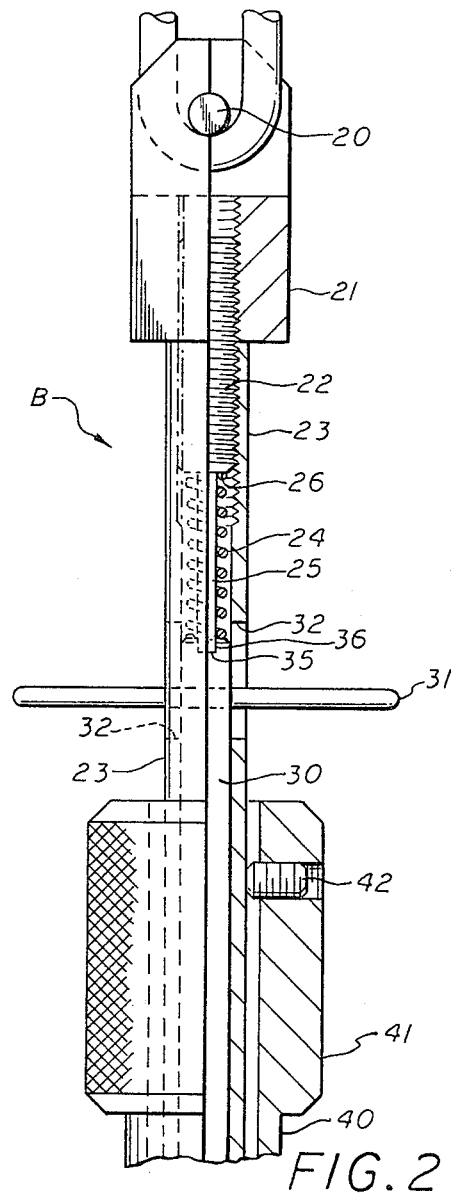
FIGS. 2 and 2A are enlarged elevation and longitudinal sections showing the lower, screw manipulating tool portions of the parts in FIG. 1.

The other end of the chain C (FIG. 2) is secured by a pin 20 to a clevis 21 attached to an extension pin 22 rigid with screw preload tube 23 of the tool B.

Figure 2A:
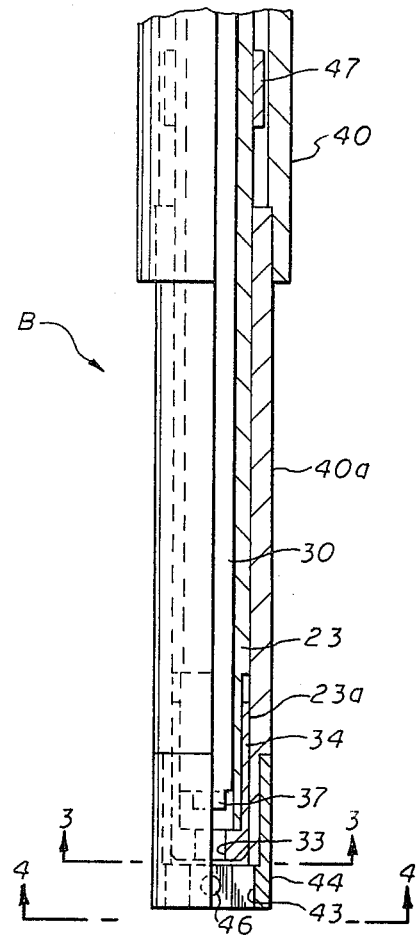
Figure 3:
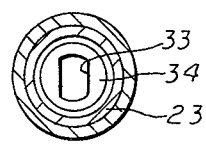
FIG. 3 is a transverse section taken on line 3—3 of FIG. 2A.

A coiled compression spring 24 (FIG. 2) is received in the upper part of intermediate, preload tube 23 about the reduced extension portion 25 of pin 22. The spring bears upwardly against the shoulder 26 between the pin parts and downwardly against the upper end of inner screw holder rod 30 to be described. A pin 31 extends transversely through diametrically opposed longitudinal slots 32 in the upper part of tube 23 and a registering hole in rod 30. At the bottom of tube 23 is a transverse slot 33 (FIGS. 3 and 2A) formed in the cup 34 secured to reduced extremity 23a of the tube. Received within preload tube 23 is the inner, screw holding rod 30 having a kerf 35 in its upper end non-rotably receiving the tongue 36 formed by the end of pin portion 25. At its lower extremity, rod 30 (FIG. 5) has spaced, depending ears 37 which embrace the flattened screw end 54, as will be explained.

Figure 4:
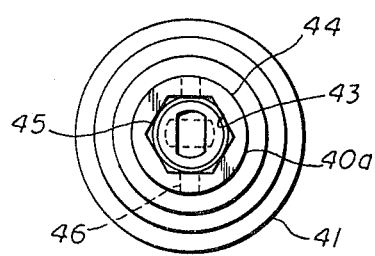
FIG. 4 is a bottom end of the structure in FIG. 2A with the lock nut in position in the tool.

The socket wrench portion 40, 40a constituting the outer member of the three part tool B, has a knurled knob 41 at its upper end loosely receiving the intermediate tube 23, and provided with a set screw 42 for selectively locking together the socket wrench 40, 40a, and tube 23. The lower part 40a of wrench 40 is separately formed and has a hexagonal bottom opening 43 (FIG. 4) formed by a cup 44 for receiving the lock nut 45. Opposed holes 46 provide for injection of a plastic substance, as silicone rubber, about the nut to temporarily hold it in position. A collar 47 secured to the intermediate part of tube 23 may engage the end of wrench lower part 40a, to limit sliding of tube 23 within the socket wrench.

Figure 5:
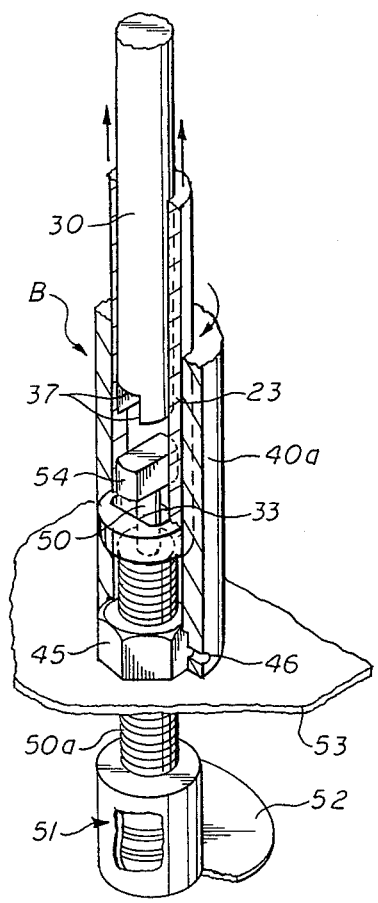
FIG. 5 is an enlarged, isometric side view of the end portion of the structure in FIG. 2A applied to an auger screw, parts being broken away.

FIG. 5 illustrates tool portion B applied to screw 50 projecting outwardly from the Belleville washer spring means 51, resiliently connecting the auger 52 embedded in tile J for protecting skin 53, generally as in Schneider U.S. Pat. No. 3,936,927. Lock nut 45 is received on the threaded portion 50a of the screw 50. The screw, at its upper end, is provided with flattened portion 54 which, when aligned with slot 33 in the end of tube 23, may pass through the slot into the interior of the tube for application of a definite, predetermined preload to spring means 51.

Figure 6:
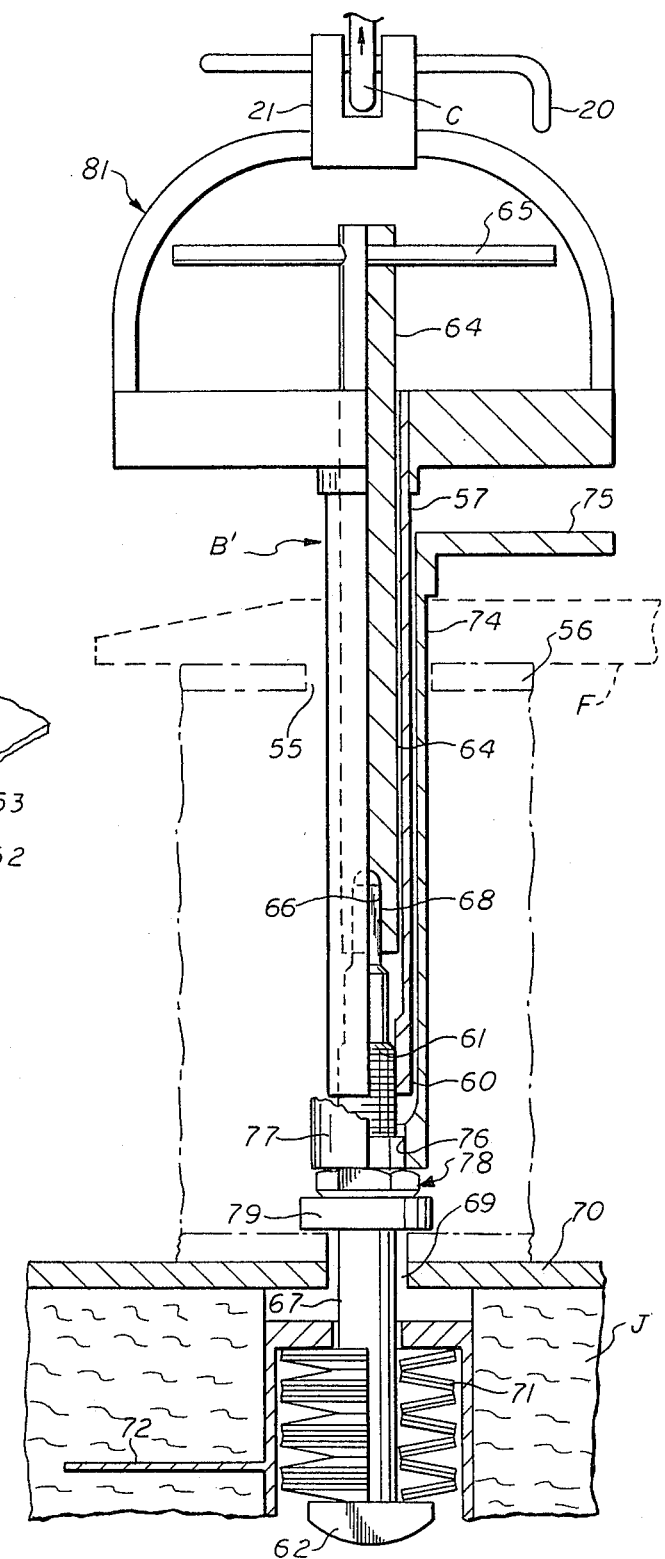
FIG. 6 is a longitudinal side view and center section of a modified form of preload tool.

The modification in FIG. 6 is similar in purpose, but considerably simplified over the first form. The screw manipulating tool B′, has three concentric, telescoping elements, as in the first form. Attached to the bar 54 at the upper end of spring preload tube 57 is a yoke 81 having a clevis 21 attached to the lower end of chain C by means of pin 20. The opposite end 60 of tube 57 is internally threaded for meshing with the lower threaded portion 61 of the screw 67.

Central, screw holding rod 64 extends from a cross pin handle 65 at the top, through tube 57, to its slotted lower end 66 receiving the flattened end 68 of screw 67 to prevent the screw from turning. Screw 67 extends through hole 69 in protected skin member 70 and aligned central holes in the stacked Belleville washers 71 to screw head 62. The Belleville washer assembly constitutes spring means interposed between tile embedded auger 71 and lock nut 78.

Finally, external socket wrench sleeve 74 has a handle 75 at its upper end and a hexagonal box 76 at its lower end 77 for receiving the lock nut 78, and washer 79 securing skin 70 to tile J.

Operation

With the jig A and nut manipulation tool B assembled, as in FIG. 1 and tensionally connected by chain C, an appropriate lock nut 45 will be inserted in the socket of outer socket wrench sleeve 40. A plastic material, as silicone rubber, will be injected through bores 46 to temporarily hold the nut in place. The protective tile and structural mounting will be placed on the base plate E with screw 50 directly below tool B, arm F having suitable positioning, guide, and stabilizing means to assist in this. The tool will then be lowered to cause the nut in the lower end to contact the shouldered end of the threaded part 50a of the screw. With knob 41 locked to tube 23, pin 31 and rod 30 will be lifted slightly against spring 24, and knob 41 turned to rotate slot 33 until it drops over the flattened end 54 of the screw. At the same time, rod 30 will drop so that its depending ears 37, now also in register with screw part 54, will straddle this part to hold the screw against turning.

Hand wheel 13 will be turned to draw tube 23 upwardly and, with it, screw 50 until meter 16 registers the desired preload on auger type spring means 51 (see auger 71 of FIG. 6). Thereupon, set screw 42 will be loosened and knob 41 turned sufficiently to permit screwing of nut 45 down snugly against the skin 53 to be protected. The set screw is then retightened and the knob and tube 23 turned to permit release of screw end 54 and tool B from the screw.

The second form, shown in FIG. 6, is manipulated as follows: First, the lock nut 78, lodged in hexagonal box 76 in the bottom end of wrench 74, is moved through the opening 55 and over the reduced portions of screw 67 to the top of screw thread 61. Inner rod 64 is placed over the flattened upper end 68 of screw 67 for preventing the screw from rotating. Handle 75 is turned to thread lock nut 78 onto screw thread 61. Screw preload tube 57 is rotated by turning yoke 81 on the upper part of screw preload tube 57 and threaded onto lower threaded portion 61 of screw 67.

Preload is applied to the auger type spring means 71 by connecting yoke 81 to clevis 21 and the preload mechanism previously described. With the preload applied, handle 75 is rotated, turning lock nut 78 until it is seated on structure 56 or washer 79. A change in the reading of meter 16 indicates proper position. Finally, tube 57 is unscrewed and the socket wrench 74 lifted off from nut 78 for removing the tool.

Various features may be modified as will occur to those skilled in the art. For instance, differently shaped interlocking elements may be provided both for tensioning the screw and compressing the spring means and holding the screw from turning while the lock nut is screwed down. The tool facilitates accurately preloading the spring means even where inconveniently located. Of course, different spring means may be used. The exclusive use of all modifications as come within the scope of the appended claims is contemplated.

We claim:

1. Means for resiliently attaching, under accurate, predetermined preload, a first, surface-protecting part and a second part to be protected thereby comprising spring means attached to said first part, a screw extending from said spring means through said second part, a nut on said screw, and a preloading tool having a plurality of telescoped elements, a first of said telescoped elements having means engaging said screw to resist turning thereof, a second of said telescoped elements having means applying a measured preload force to said screw and said spring means, and a third of said telescope elements having means for screwing said nut against said second part to retain said preload force.

2. The combination described in claim 1 in which said second of said telescoped elements incorporates a force measuring device.

3. The combination described in claim 2 in which said first part is a frangible protective tile and further including an auger embedded in said tile and connected by said spring means to said screw.

4. The combination described in claim 2 in which said screw and said means engaging said screw have interengageable parts for preventing turning of said screw relative to the third of said telescoped elements.

5. The combination described in claim 4 in which the third of said telescoped elements is a socket wrench.

6. The combination described in claim 2 in which said screw has a flattened end portion and the second of said telescoped elements has a slot in its end to receive said screw portion therethrough in the registering positions of said screw portion and said slot.

7. A multiple function tool for manipulating a spring loaded threaded screw and nut assembly positioned relatively inaccessibly comprising first, second, and third telescoped, elongated elements, said first element and said screw having interengaging structure for retaining said screw non-rotative, said second element and said screw having interengaging elements for applying a longitudinal force to said screw, said second element including a force measuring instrument operatively connected therewith, and said third element comprising a socket wrench interengaging with said nut.

* * * * *